UNITED STATES PATENT OFFICE.

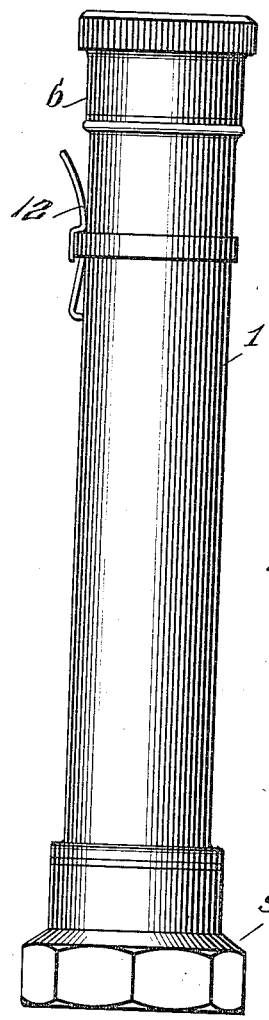
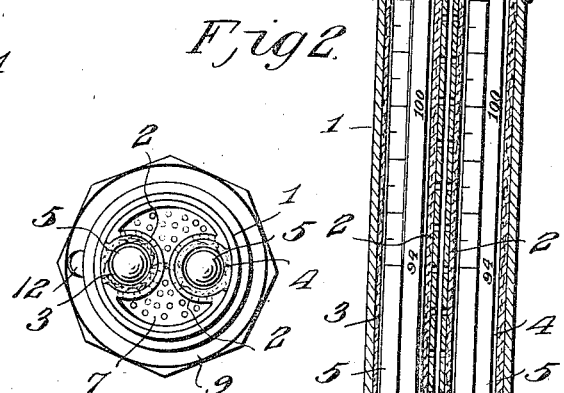
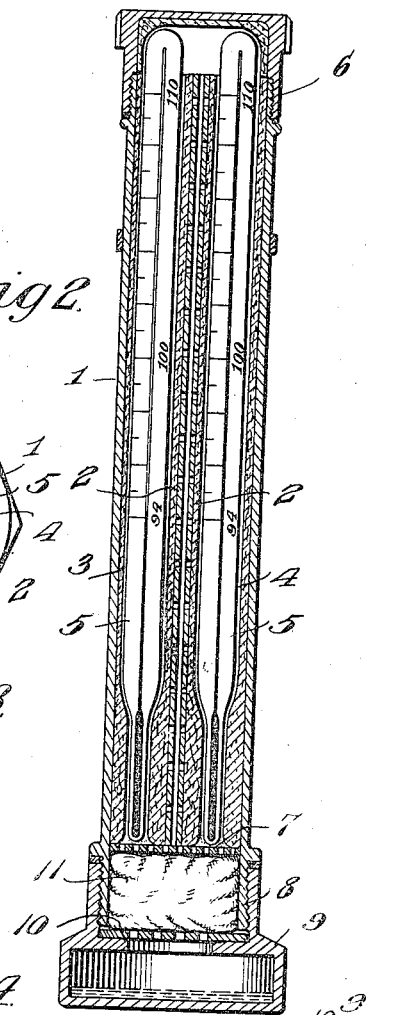
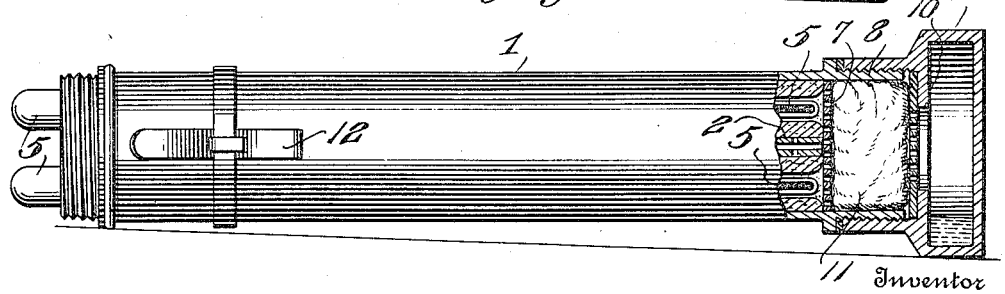

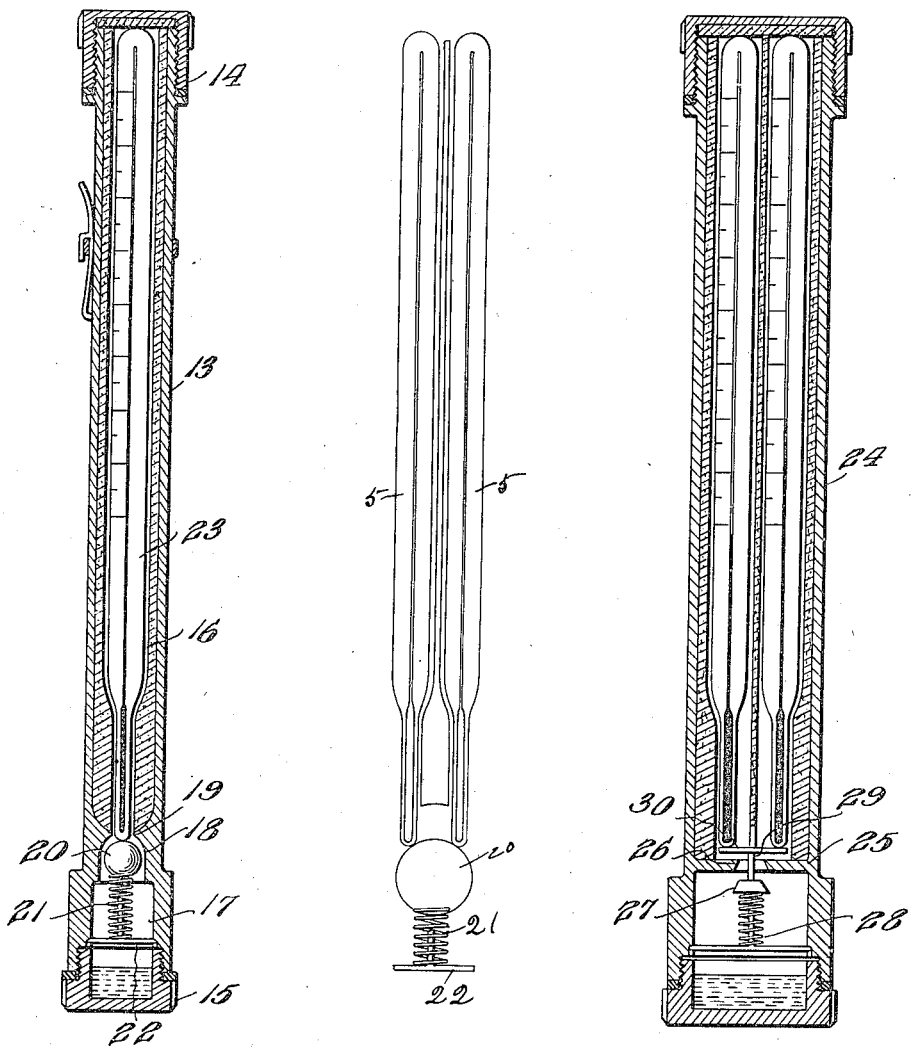

HOWARD R. SMITH, OF WASHINGTON, PENNSYLVANIA.

THERMOMETER-CASE.

1,008,746.  Specification of Letters Patent.  Patented Nov. 14, 1911.

Application filed January 18, 1911.  Serial No. 603,339.

*To all whom it may concern:*

Be it known that I, HOWARD R. SMITH, a citizen of the United States, residing at Washington, in the county of Washington and State of Pennsylvania, have invented new and useful Improvements in Thermometer-Cases, of which the following is a specification.

This invention relates to pocket cases and particularly to cases which are adapted to hold clinical thermometers.

The object of the invention is the provision of a device of this character adapted to hold one or a plurality of thermometers and to contain a suitable amount of any well-known antiseptic fluid, such as formaldehyde or the like, whereby the thermometers may be properly sterilized and the germ life thereon killed.

A further object of the invention is the provision of a device of this character having a removable aseptic holder which is adapted to prevent the case from rolling over when laid upon its side and which is of such diameter as to hold the aseptic without allowing any of the fluid to run into the case proper.

A still further object of the invention is the provision of means for effectually cutting off the aseptic chamber from the thermometer chamber when the thermometer is removed and which means is actuated by the thermometer or thermometers to open said chamber so that it will communicate with the thermometer chamber when the thermometer is placed in the case.

A still further object of the invention is the provision of a compartment adapted to contain absorbent material which will prevent the aseptic fluid from passing into the case proper but which will admit of the passage of fumes from said fluid.

Further objects of the invention will appear as the following specific description is read in connection with the accompanying drawing, which forms a part of this application, and in which:—

Figure 1 is an elevation of the device. Fig. 2 is a vertical longitudinal section. Fig. 3 is a top plan view showing the top open. Fig. 4 is an elevation, partly in section, showing the thermometer case lying upon its side. Fig. 5 is an enlarged sectional view showing a modified form of case adapted for a single thermometer. Fig. 6 is an enlarged detailed sectional view of a further modification showing a thermometer actuated valve adapted for either single or double thermometer cases. Fig. 7 is a diagrammatic view showing the application of the device in Fig. 5 to double thermometer cases.

Referring more particularly to the drawing, 1 represents an elongated tubular casing having a central partition 2 which divides the casing into separate compartments 3 and 4 both of which are lined with any suitable material so as to prevent the thermometers 5 from coming into contact with the walls of the device, and thus permit a freer circulation of the sterilizing fumes about the thermometers. A suitable cap 6 is provided and is either screwed upon the casing 1 or hinged thereto in such a manner as to make the joint between the casing and the lid substantially air-tight. The bottom of the casing is provided with a foraminous false bottom 7. Extending below the bottom is an extension 8 upon which is frictionally held a receptacle 9 provided with a foraminous partition 10 adapted to form, with the bottom 7 and the extension 8, a compartment 11 which is preferably loosely filled with cotton or the like.

The receptacle 9 is preferably somewhat larger than the tube 1 and of octagon formation so that when the case is laid upon its side, as shown in Fig. 4, the tube will be prevented from rolling and fluid in the receptacle will not run into the tube. A suitable clamp 12 is provided so that the case may be properly secured to the pocket of the wearer.

Only enough of the aseptic fluid or other sterilizing medium is placed in the receptacle to accomplish the purpose desired and not enough to overflow into the tube when the case is laid upon its side. In case, however, that some of the fluid should accidentally pass the partition 10 the cotton or other absorbent material in the compartment 11 would take up the liquid and prevent its passage into the tube. This precaution need not be taken when the germicide is of such a nature that it will permit the thermometer to come into contact therewith without being harmful thereto. The holes in the partition 10 are arranged in the center thereof so as to provide a further barrier around the edges of the partition which will prevent the aseptic fluid from flowing into the absorbent compartment.

In the modified form shown in Fig. 5 an elongated casing 13 is shown having a screw cap 14 to close its upper end and a screw plug 15 to close its lower end. The casing is divided into separate compartments 16 and 17 by means of an inclined partition 18 which is centrally apertured, as at 19. The aperture is closed by a ball valve 20 which is supported upon a light spiral spring 21 whose opposite end is mounted upon the bridge piece 22 extending across the compartment 17. The partition 18 is located across the casing at such a distance from the upper end that the thermometer 23, when pressed into the casing by the cap 14, will engage the ball 20 and force the same off its seat so that the fumes of the aseptic liquid in the chamber 17 may be given free access to the thermometer in the compartment 16.

In the modified form shown in Fig. 6, the casing 24 is provided with a horizontal partition 25 which is apertured at 26 and seated in the aperture is a valve 27 held in position by a light spiral spring 28. This valve has extending from its upper surface an upright 29 upon which is supported, in a secure manner, a platform 30 with which the thermometer is adapted to contact. This platform may be made of sufficient width to form a seat for two thermometers which may be divided in the manner shown in Figs. 1 to 4.

In the modified form shown in Fig. 7 the ball valve is of sufficient size to permit two thermometers to rest thereon. This arrangement is similar to the arrangement shown in Fig. 5 with the exception that the ball is large enough to accommodate two thermometers and a partition divides the thermometer compartment in two, as in Figs. 1 to 4.

Having thus described the invention, what I claim as new is:—

1. A thermometer case comprising a tubular body, an apertured bottom therefor, a tubular extension on the body, and aseptic receptacle removable from said extension and having an angular formation, said receptacle coacting with the bottom and extension to form a compartment.

2. A thermometer holder comprising a tubular casing, a partition separating said casing into separate compartments, one of said compartments adapted to receive the sterilizing fluid, and means controlled by a thermometer in the casing for preventing access of the sterilizing fluid to the thermometer compartment.

3. A thermometer holder comprising a tubular casing, a partition separating said casing into separate compartments, one of said compartments adapted to receive the sterilizing fluid, and a thermometer operated valve for preventing access of the sterilizing fluid to the thermometer compartment.

In testimony whereof I affix my signature in presence of two witnesses.

HOWARD R. SMITH.

Witnesses:
GEO. F. SMITH,
M. P. RUSH.